June 9, 1936.  O. E. SOMMERFELD  2,043,338
DENTAL PLATE CLEANING BRUSH
Filed July 27, 1934
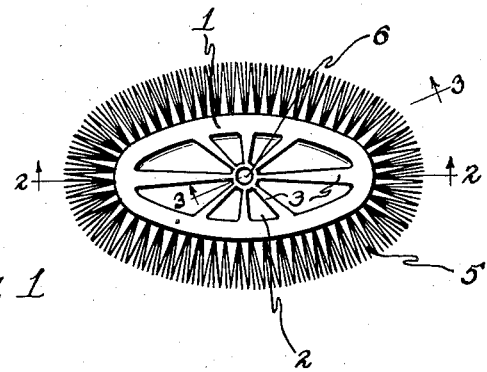
Fig. 1
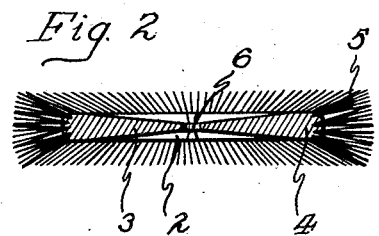
Fig. 2
Fig. 3
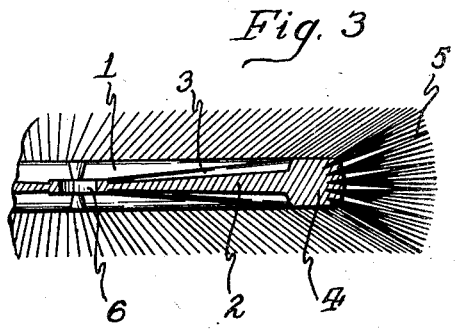
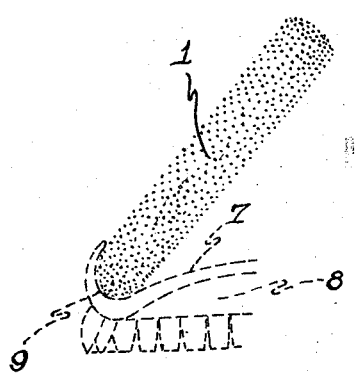
Fig. 4
Inventor
Oscar E. Sommerfeld
Arnold M Ehrlich
atty.

Patented June 9, 1936

2,043,338

UNITED STATES PATENT OFFICE 2,043,338

DENTAL PLATE CLEANING BRUSH

Oscar E. Sommerfeld, Oak Park, Ill.

Application July 27, 1934, Serial No. 737,243

1 Claim. (Cl. 15—160)

My invention relates to an improved cleaning appliance and more particularly to a brush designed for use in cleaning artificial teeth plates.

The main object of my invention is to provide a cleaning appliance for thoroughly and easily removing various deposits of foods, film and the like from numerous crevices, pockets and interstices which are relatively inaccessible with the ordinary cleaning brushes in use at the present time.

A second object of my invention is to provide a cleaning appliance constructed with the configuration and arrangement of bristles which will permit the brush to reach into and follow the gingival pockets formed by the curvature of the dental plates.

A third object of my invention is to provide an eliptically shaped cleaning brush which can be easily and firmly held between the thumb and the remaining fingers of the operator's hand.

Further objects of my invention are to provide a cleaning appliance for dental plates easily carried on the operator's person or in a handbag; to provide a cleaning brush that can be easily and cheaply manufactured; numerous other objects of my invention will be shown and made apparent further in this specification.

An illustrative embodiment of this novel invention is shown in the accompanying drawing wherein:

Fig. 1 is a plan elevational view of my device.

Fig. 2 is a cross section of the device taken on line 2—2 of Fig. 1.

Fig. 3 is an enlarged section of the device taken on line 3—3 of Fig. 1.

Fig. 4 is a side elevational view of the brush as applied to the gingival region of an artificial dental plate partially shown in dash lines.

The cleaning brush for the artificial dental plates as shown in the accompanying drawing is generally designated by numeral 1, and comprises an eliptically formed body 2 which is made of celluloid, composition or other similar material. The body 2 has a plurality of ribs 3 radially formed thereon to afford a gripping surface for the operator's fingers. The periphery or rim 4 of the body 2 is of a greater thickness than the rest of the body 2 and is the base in which the bristles 5 are permanently secured. The bristles 5, Figs. 2 and 3, are arranged in the periphery 4 in such manner as to extend radially approximately thirty degrees above and below the horizontal axis of the body 2. In the center of the said body 2 is an aperture 6 provided as a means for suspending the brush 1 when it is not in use.

It is well known to those in the dental profession and to those using the artificial dental plates, that one of their greatest difficulties is cleaning out the food, film, and various other foreign properties which gather and accumulate in the crevices and interstices of the dental plates and more particularly the upper or inner face 7, Fig. 4, of the said dental plate 8, as it is left in a rough and unpolished condition. The gingival regions 9 of the dental plate are especially hard to clean with the ordinary tooth brush that is customarily used, and these said regions are thereby sadly neglected and permitted to get into an unsanitary condition, which is often very injurious to the user of the artificial dental plate.

My novel brush 1 overcomes these difficulties in that it has no handles or other obstructing parts to hinder the bristles 5 from reaching into the bottom of the gingival pockets 9 and the interstices therein. The brush 1 being eliptical in shape permits its use in the narrow and curved parts of the dental plate 8, and the specially angled arrangement of the bristles 5 gives a greater brushing area to the said brush 1. The operator holds the brush body 2 firmly between the thumb and his remaining fingers without having it slip or turn in his fingers because of the ribs 3 provided on both sides of the brush body 2. The operator simply applies the portion of the curved brush 1, coinciding with the curvature of the dental plate 8 and by manipulating the brush with an oscillatory motion, all the impurities can be easily and thoroughly removed from the dental plate.

Although but one specific embodiment of this invention has been herein shown and described it will be understood that numerous details may be altered or omitted without departing from the spirit of the invention.

What I claim is:

A brush having a flattened body elliptical in plan aspect, sets of bristles mounted in the periphery of said body in elliptical formation, certain of said sets of bristles extending outwardly in the longitudinal plane of said body and certain of said sets of bristles extending angularly outwardly of said periphery above and below said body, said periphery being convex in vertical cross section, a perforated hub portion formed centrally of said body, and radial ribs formed intermediate the hub and outer periphery of said body, said ribs being tapered inwardly towards said hub, and smaller in vertical cross section than said body at their outer ends.

OSCAR E. SOMMERFELD.